(12) United States Patent
Oran

(10) Patent No.: US 7,233,605 B1
(45) Date of Patent: *Jun. 19, 2007

(54) METHOD AND APPARATUS FOR MINIMIZING DELAY INDUCED BY DTMF PROCESSING IN PACKET TELEPHONY SYSTEMS

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 10/888,724

(22) Filed: Jul. 8, 2004

(51) Int. Cl.
*H04J 3/12* (2006.01)
(52) U.S. Cl. .................... 370/526; 370/528
(58) Field of Classification Search ............ None
See application file for complete search history.

(56) References Cited

U.S. PATENT DOCUMENTS

| 4,506,358 | A |   | 3/1985 | Montgomery |         |
|-----------|---|---|--------|------------|---------|
| 5,666,357 | A | * | 9/1997 | Jangi      | 370/345 |
| 5,737,331 | A | * | 4/1998 | Hoppal et al. | 370/349 |
| 6,259,691 | B1 | * | 7/2001 | Naudus | 370/352 |
| 6,272,358 | B1 | * | 8/2001 | Brent et al. | 370/352 |
| 6,298,055 | B1 | * | 10/2001 | Wildfeuer | 370/352 |
| 6,385,202 | B1 | * | 5/2002 | Katseff et al. | 370/352 |

\* cited by examiner

*Primary Examiner*—Hassan Kizou
*Assistant Examiner*—Salman Ahmed
(74) *Attorney, Agent, or Firm*—Marger Johnson & McCollom P.C.

(57) ABSTRACT

The invention solves the problem of DTMF delay by shifting the delay and in-band signal processing to the receiving packet gateway. The transmitting gateway continues to process and transmit voice packets while also detecting DTMF signals. The receiving gateway's jitter buffer holds voice packets for the worst-case DTMF detection period. As the receiving gateway is about to play out a voice packet it checks to see if a packet has arrived indicating DTMF was present. If not, the voice is played out as usual. If DTMF is present, the voice is muted and a DTMF generator invoked by the receiving gateway to recreate the DTMF signaling. The audio remains muted until no more time periods are marked as containing DTMF. In this way, the delay in voice playout due to the possible presence of DTMF is completely subsumed in the normal jitter buffer delay.

19 Claims, 5 Drawing Sheets

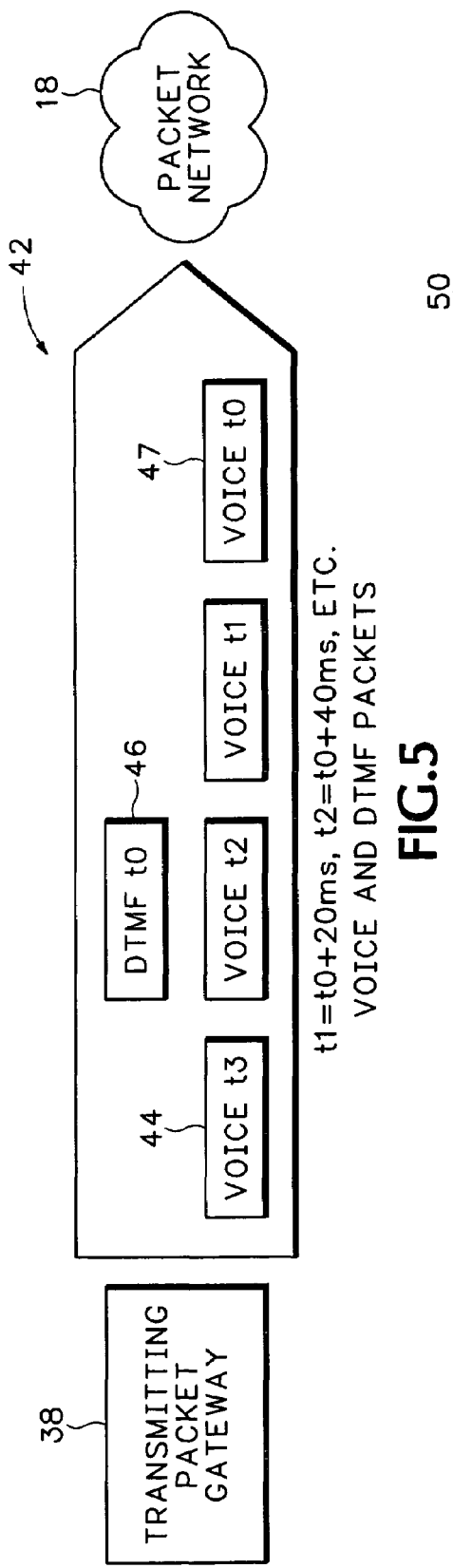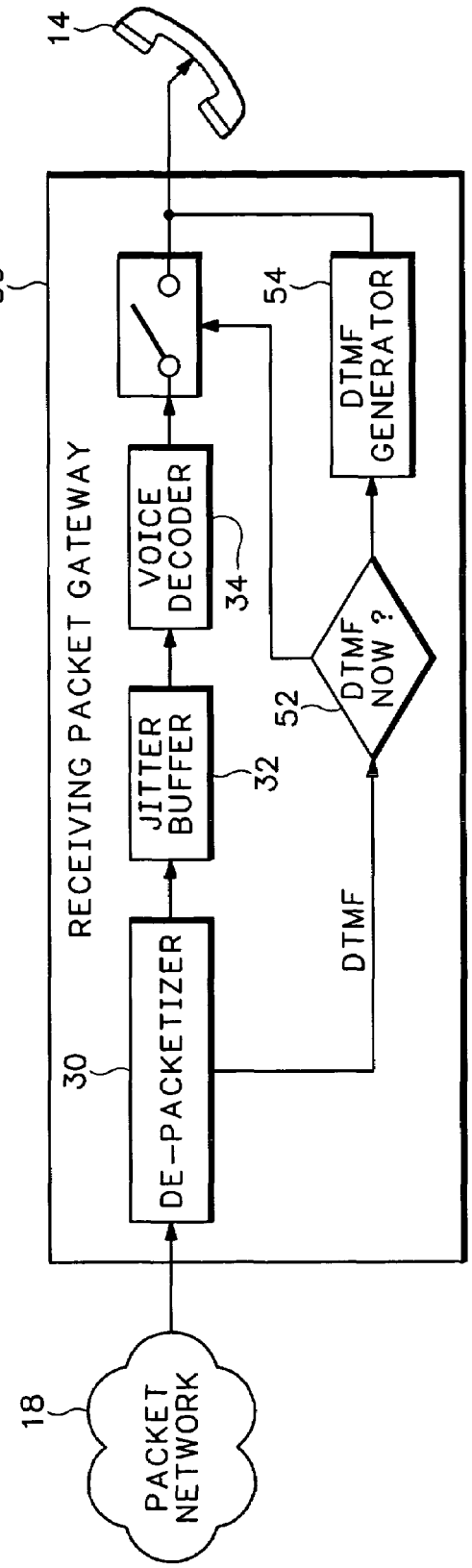

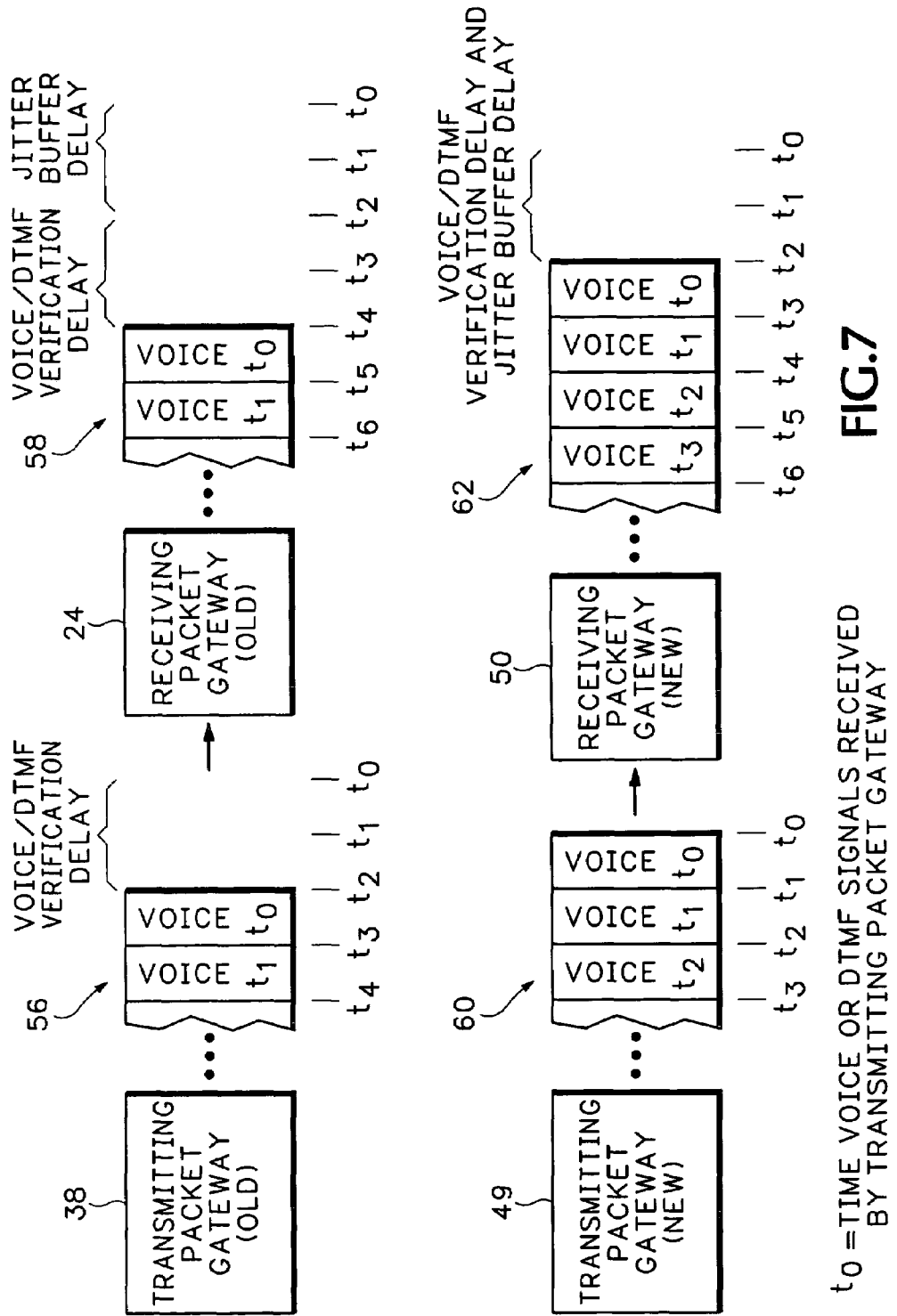

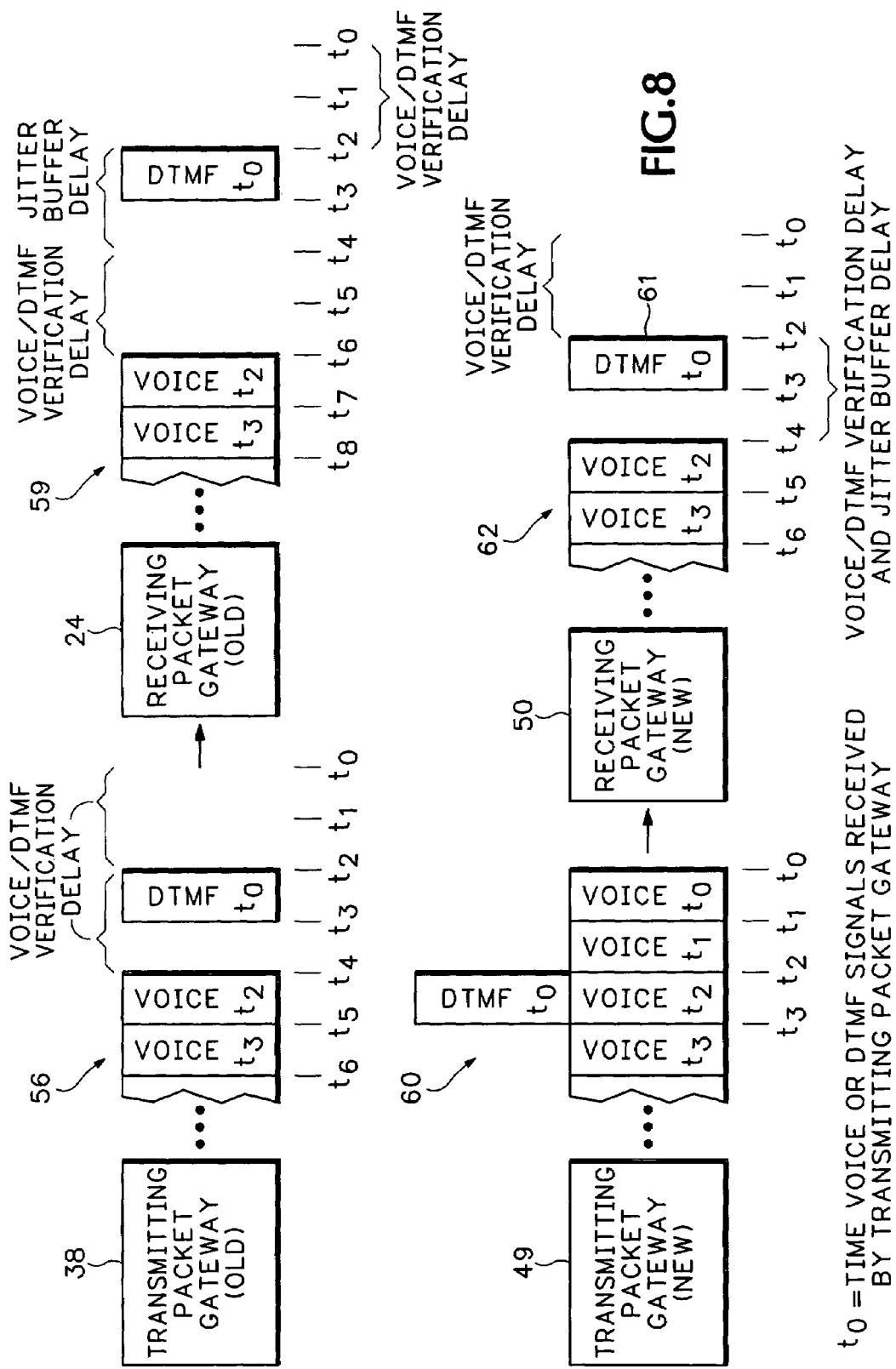

METHOD AND APPARATUS FOR MINIMIZING DELAY INDUCED BY DTMF PROCESSING IN PACKET TELEPHONY SYSTEMS

BACKGROUND OF THE INVENTION

This invention relates generally to methods and systems for communication of real-time audio, video, and data signals over a packet-switched data network, and more particularly to a method and system for minimizing delay induced by DTMF processing.

FIG. 1 is a diagram of the general topology of a packet telephony system 12. The packet telephony system 12 includes multiple telephone handsets 14 connected to a packet network 18 through gateways 16. The gateways 16 each include a codec for converting audio signals into audio packets and converting the audio packets back into audio signals.

The handsets 14 are traditional telephones or any other device capable of transmitting and/or receiving DTMF signals. Gateways 16 and the codecs used by the gateways 16 are any one of a wide variety of currently commercially available devices used for connecting the handsets 14 to the packet network 118. For example, the gateways 16 can be Voice Over Internet Protocol (VoIP) telephones or personal computers that include a digital signal processor (DSP) and software for encoding audio signals into audio packets. The gateways 16 operate as a transmitting gateway when encoding audio signals into audio packets and transmitting the audio packets over the packet network 18 to a receiving endpoint. The gateways 16 operate as a receiving gateway when receiving audio packets over the packet network 18 and decoding the audio packets back into audio signals. Since packet telephony gateways 16 and codecs are well known, they are not described in further detail.

A conventional packet telephony gateway transmit path is shown in the transmitting gateway in FIG. 2. The transmitting packet gateway 20 includes a voice encoder 22, a packetizer 24, and a transmitter 26. Voice encoder 22 implements the compression half of a codec. Packetizer 24 accepts compressed voice data from encoder 22 and formats the data into packets for transmission. Transmitter 26 places the audio packets from packetizer 24 onto packet network 18.

A receiving packet gateway 24 is shown in FIG. 3. The receiving gateway 24 reverses the process utilized by transmitter 14. A depacketizer 30 accepts packets from packet network 18. A jitter buffer 32 buffers data frames and outputs them to voice decoder 34 in an orderly manner. A voice decoder 34 implements the decompression half of the codec employed by voice encoder 22 (FIG. 2).

Low bit-rate codecs 22, 34 typically model the bandpass filter arrangement of the human auditory system, including the frequency dependence of auditory perception, in allocating bits to different portions of a signal. In essence, low bit-rate encoding often involves many decisions to discard or ignore actual information not typically represented in human speech.

Because it is optimized for human speech, voice encoding can produce undesirable effects if the audio signal being encoded is not of this form. Computer modem and facsimile audio signals are examples of such signals; both can be badly distorted by voice encoding. Modems and facsimile machines employ in-band signaling, i.e., they utilize the audio channel of a telephony connection to convey data to a non-human receiver. However, modem and facsimile traffic do not "share" a voice line with a human speaker. Packet telephony systems can therefore detect such in-band traffic during call connection and switch it to a higher bandwidth, non-voice encoding channel.

Other types of in-band signals share a voice channel with a human speaker. Most common among these are the DTMF (dual-tone multi-frequency) in-band signals generated by a common 12-button telephone keypad. Voice mail, paging, automated information retrieval, and remote control systems are among the wide variety of automated telephony receivers that rely on DTMF in-band control signals keyed in by a human speaker.

Because the signal is carried "in-band" as part of the encoded voice stream, DTMF is poorly encoded by the system shown in FIG. 2 if a low bit-rate coder is used. The reconstructed DTMF signals may be unrecognizable to an automated DTMF receiver. One popular low bit-rate coder, G.723.1, is widely recognized to have very poor DTMF fidelity. Other low bit-rate CODECs also have marginal DTMF fidelity upon decode and are therefore unsuitable without modification for many telephony applications, such as Interactive Voice Response (IVR).

In order to avoid these fidelity problems, more sophisticated packet telephony systems are capable of detecting DTMF in the transmitting gateway in parallel with voice encoding. FIG. 4 depicts a parallel voice-encoding/DTMF detector transmitting packet gateway 38. Transmitting gateway 38 operates a DTMF in-band signal detector 40 on an uncompressed audio data stream 20, in parallel with voice encoder 22. If speech is present in the data stream 20, packetizer 24 will be supplied with a voice-encoded signal from encoder 22. If a DTMF signal appears in the data stream, the DTMF signal, rather than the voice-encoded signal, is supplied separately to packetizer 24. This system allows DTMF signals to effectively bypass the voice codec 22, thereby avoiding DTMF signal distortion. FIG. 4 depicts one of several different schemes where the suppression of the voice is done before packetization.

Although a parallel voice-encoding/DTMF detector packet telephony transmitter 38 can avoid DTMF fidelity problems, this capability comes at the price of higher latency. International Telecommunications Union (ITU) standards specify that a valid DTMF signal be at least 40 milliseconds (ms.) in duration. During the 40 ms. duration of a DTMF pulse, the voice encoder 22 is not allowed to ship frames containing voice-compressed DTMF. Otherwise, the receiver could garble the DTMF signal or identify two signals, the first voice-encoded signal and the second DTMF detector-generated signal.

To avoid this problem, voice encoder 22 delays all speech output by a fixed delay of at least 40 ms. to allow the DTMF detector 40 to detect valid DTMF samples. This delay allows the transmitter to switch smoothly from voice-encoding to DTMF transmission without causing confusion at the receiving packet gateway 24 (FIG. 3). Unfortunately, this same delay adds to the call latency perceived by voice callers utilizing the packet voice connection.

The consequence for end-to-end delay in packet telephony system 12 (FIG. 1) is that all speech must be delayed by a minimum of 40 ms. in the transmitting gateway 38. If this is not done, the receiving gateway would first receive 40 ms. of speech which is actually DTMF, followed after an unpredictable interval by the true DTMF packets. The receiving gateway then plays out one or the other or both, resulting in either garbled DTMF, or possibly a duplicated input such as two "9's" rather than one.

Accordingly, a need remains for accurately detecting and transmitting DTMF without adding additional end-to-end delay to the packet network.

SUMMARY OF THE INVENTION

The invention solves the problem of DTMF delay by shifting the delay and in-band signal processing to the receiving packet gateway. The invention exploits the fact that in any packet telephony system the receiving gateway already has a built-in playout delay in the form of a jitter buffer. The jitter buffer exists to smooth out the unavoidable delay variations in packet arrival introduced by the packet network.

The process of discarding or muting audio packets that contain DTMF signaling is shifted to the receiving gateway. The transmitting gateway can then continue to process and transmit voice packets while also detecting DTMF signals. The receiving gateway's jitter buffer holds voice packets for the worst-case DTMF detection period. As the receiving gateway is about to play out a voice packet it checks to see if a packet has arrived indicating DTMF was present. If not, the voice is played out as usual. If DTMF is present, the voice is muted and a DTMF generator invoked by the receiving gateway to recreate the DTMF signaling. The audio remains muted until no more time periods are marked as containing DTMF. In this way, the delay in voice playout due to the possible presence of DTMF is completely subsumed in the normal jitter buffer delay.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 5 is a schematic diagram showing how voice and DTMF packets are transmitted in a transmitting gateway according to the invention.

FIG. 6 is a schematic diagram of a receiving packet gateway according to the invention.

FIGS. 7 and 8 are schematic diagrams comparing the voice playout delays of a prior art telephony system and a telephony system according to the invention.

DETAILED DESCRIPTION

Figure 1:
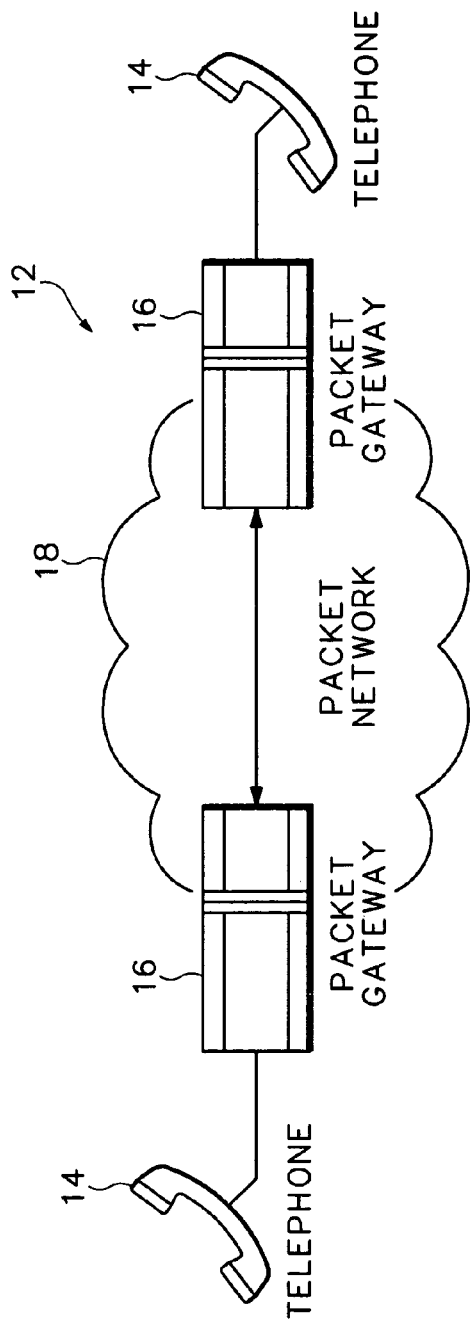
FIG. 1 is a schematic diagram of a prior art packet telephony system.
Figure 2:
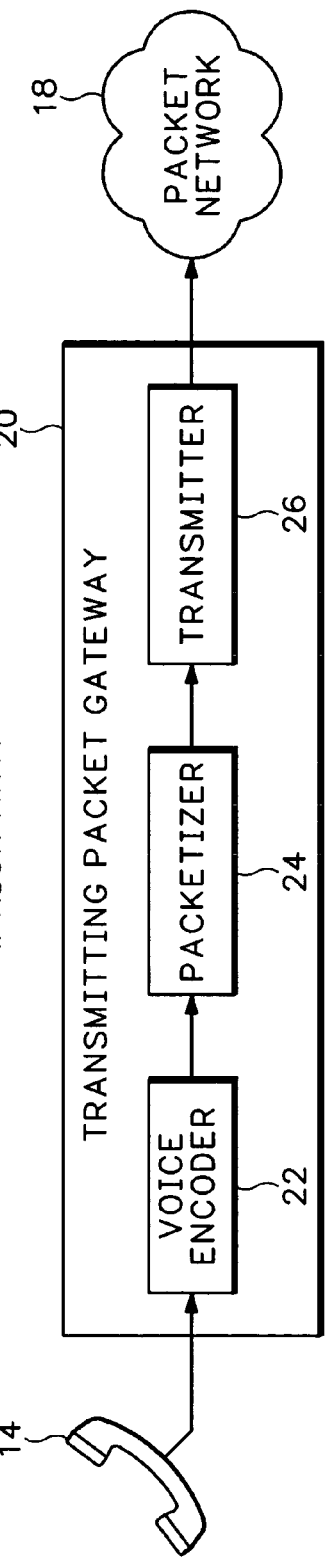
FIG. 2 is a schematic diagram of a prior art transmitting packet gateway with in-band DTMF signaling.
Figure 3:
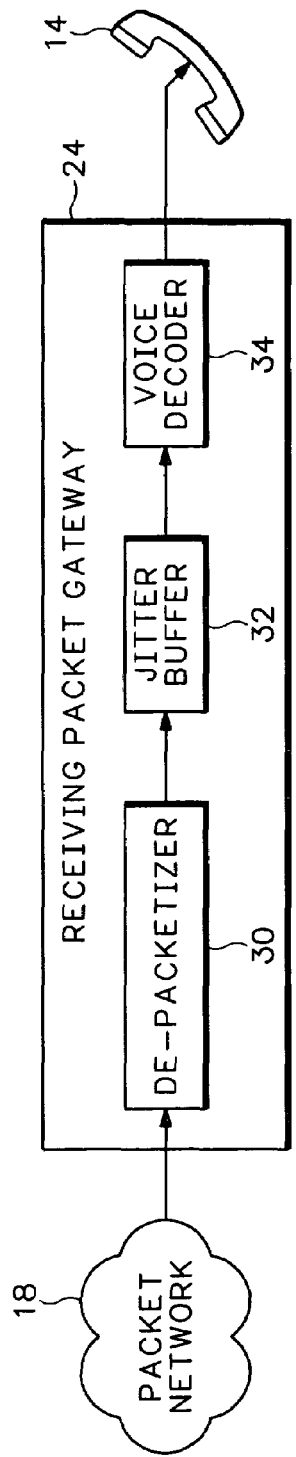
FIG. 3 is a schematic diagram of a prior art receiving packet gateway.
Figure 4:
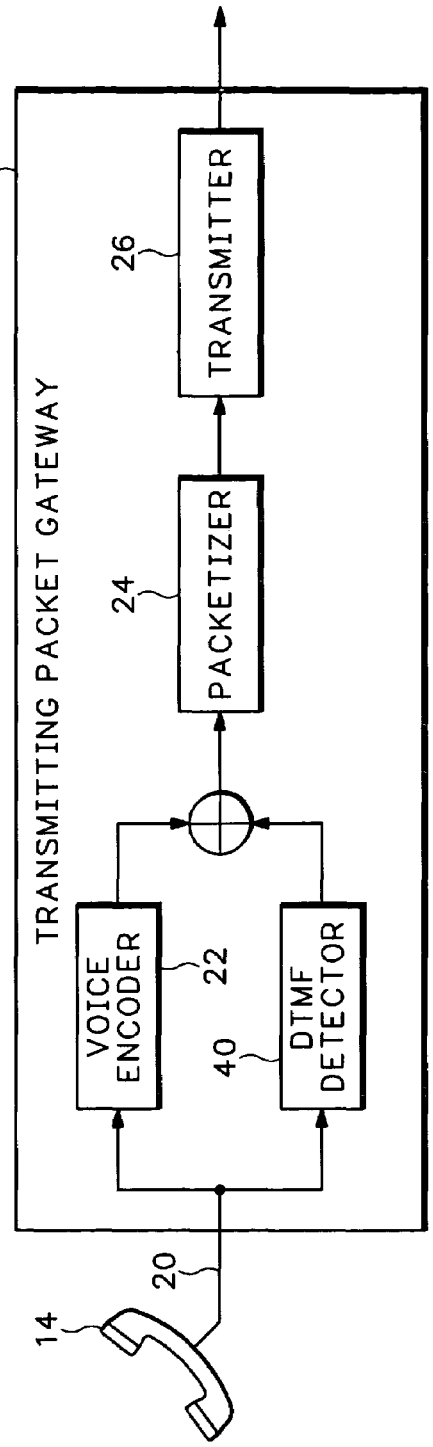
FIG. 4 is a schematic diagram of a prior art transmitting packet gateway with a DTMF detector.

Referring to FIG. 5, a packet stream 42 is transmitted from a transmitting gateway 49 utilizing this invention. The transmitting gateway 49 does not delay sending voice packets while identifying either voice data or DTMF data in the data stream 20 (FIG. 4). Instead, voice packets t0–t3, etc. are always encoded and transmitted regardless of whether the data stream 20 from telephone 14 is voice data or DTMF data. As mentioned above, ITU standards require the transmitting gateway to sample a minimum of 40 ms. of the data stream 20 for a possible DTMF signal.

If the data stream 20 is a DTMF signal, DTMF detector 40 and packetizer 24(FIG. 4) generates a DTMF t0 packet 46 after 40 milliseconds. The DTMF packet 46 has a time stamp t0 and is associated with the same time stamp t0 for voice packet 47. The fact that packets 46 and 47 have the same time stamp indicate that voice packet 47 is a voice packet that also contains DTMF signaling data. The voice encoder 22 and packetizer 24 generates voice packets t1–t3 having associated time stamps of 20 ms. intervals. The voice packet t1 has a time stamp t1=t0+20 ms. and voice packet t2 has a time stamp t2=t0+40 ms., etc. The time stamp interval can vary depending on the network configuration and the coder in use.

FIG. 6 shows a receiving packet gateway 50 that processes the packet stream 42 in FIG. 5 according to the invention. Packets in packet stream 42 arrive at the receiving packet gateway 50, possibly at irregular intervals. These packets are de-packetized and placed in a jitter buffer 32. At fixed times, determined by the particular voice CODEC 34, voice data is taken from the head of the jitter buffer 34, decoded, and played out. The size of the jitter buffer 32 is determined by the amount of delay variation expected in the packet network 18. In more sophisticated packet telephony gateways, the jitter buffer 32 is adaptively sized. The jitter buffer generally cannot grow smaller than 2–3 voice packets. In typical low-bit rate codecs this translates to 40–60 ms. of jitter buffer in the receiving packet gateway 50.

The receiving packet gateway 50 receives and stores the voice packets 44 up to the current size of the jitter buffer 32. The voice packets 44 for packets t0 and t1 are received and stored in the jitter buffer 32. After approximately 40 ms., both the voice packet t2 and DTMF t0 packet arrive. The arrival of the DTMF packet 46 causes the receiving gateway 50 to take special action.

As voice packet t0 is about to play out, a DTMF packet detector 52 checks to see if a packet has arrived indicating DTMF was present at time t0. If not, the voice packet t0 is played out as usual. If DTMF was present at t0, the DTMF packet detector 52 disables voice decoder 34 from outputting the audio signal from voice packet 47 (FIG. 5). At the same time the DTMF generator 54 is enabled to recreate the DTMF signal from the t0 DTMF packet 46. The DTMF packet detector 52 continues to mute the audio from voice decoder 34 until no more time periods are marked as containing DTMF signals. In this way, the delay in voice playout due to the possible presence of DTMF is completely subsumed in the delay in the jitter buffer 32.

This is illustrated in further detail in FIGS. 7 and 8. FIG. 7 compares the delays for a voice packet stream without a DTMF signal. FIG. 8 compares the packet delay for a packet stream with a DT/F signal. The time t0 references the time a voice or DTMF signal is first received by the transmitting packet gateway 38.

Referring to FIG. 7, a prior art transmitting packet gateway 38 delays transmitting the packet stream 56 enough time to determine whether the input data stream is voice data or a DTMF data. For time intervals of 20 ms. and a minimum DTMF qualifying time of 40 ms., the first voice packet 56 is not transmitted on the packet network 18 until time t2. The receiving packet gateway 24 receives and stores the voice packets in packet stream 56 in a jitter buffer.

The voice packets are delayed again in the jitter buffer several time periods before being played-out. For illustrative purposes, a jitter buffer delay of 40 ms. will be used. The voice packets are played out from receiving packet gateway 24 as voice stream 58. The voice stream 58 now has a total delay of at least 80 ms. including the 40 ms. verification delay from the transmitting packet gateway 38 and the 40 ms. jitter buffer delay from the receiving packet gateway 24.

Conversely, the transmitting packet gateway 49 according to the invention does not delay transmitting voice packets in packet stream 60. The first voice packet t0 is encoded and transmitted by the transmitting gateway 49 as soon as it is received from the data stream 20 (FIG. 4). The receiving packet gateway 50 loads the packet stream 60 into the jitter buffer 32 (FIG. 6) to account for delay variations individual voice packets may experience in packet network 18. During this jitter buffer delay period, the receiving packet gateway 50 identifies any DTMF packets that arrive from transmitting packet gateway 49. DTMF t0 packet is received by the time voice packet t0 is ready to be output from the jitter buffer (40 ms.). The voice packet to is accordingly output in voice stream 62. This continues with each subsequent voice packet until a DTMF packet arrives.

The 40 ms. period needed to identify the packet as either voice data or DTMF signaling is overlapped with the 40 ms. jitter buffer delay period. Thus, the total delay created by packet gateways 49 and 50 in the voice stream 62 is only 40 ms.

Referring to FIG. 8, a conventional transmitting gateway 38 generates a packet stream 56 with a detected DTMF signal. After the 40 ms. delay required to verify a DTMF signal, the transmitting packet gateway 38 sends a DTMF packet t0 in packet stream 56. The prior art receiving packet gateway 24 generates the DTMF signal 58 but delayed by at least the 40 ms. created by voice/DTMF verification in the transmitting packet gateway 38. The next input to the transmitting packet gateway 38 is a voice signal received at time t2. The voice packet t2 is also delayed 40 ms. for voice/DTMF verification before being encoded and transmitted in packet stream 56.

The voice packet t2 is delayed a total of 80 ms. before being output from the receiving packet gateway 24 in voice stream 59. The 80 ms. delay includes the 40 ms. delay from the transmitting packet gateway 38 during voice/DTMF verification and the 40 ms. jitter buffer delay in the receiving gateway 24.

Conversely, the transmitting packet gateway 49 according to the invention sends voice packets t0–t3 regardless of whether a DTMF signal is detected. When the DTMF signal is verified for time t0 at 40 ms., a DTMF packet to is transmitted in the packet stream 60. A voice signal is received and encoded as voice packet t2 in packet stream 60. The DTMF packet to is converted back into a DTMF signal 61 and output from receiving packet gateway 50 with the 40 ms. delay necessary for DTMF verification. Additional delays in outputting the DTMF signal may be created in the receiving packet gateway 50. These delays are overlapped, however, with the 40 ms. DTMF verification delay and do not create additional delay.

The voice packet t2 is received and loaded into the jitter buffer 32 in receiving packet gateway 50. The time required to verify the voice packet t2 does not contain a DTMF signal and is overlapped with the jitter buffer delay in receiving packet gateway 50. As a result, the voice packet t2 is only delayed 40 ms. before being played out. Thus, voice packet t2 has 40 ms. less delay than the voice packet t2 played out from receiving packet gateway 24.

There are a number of alternative techniques that may be used to transmit the DTMF indications from the transmitting gateway 49 to the receiving gateway 50. Any are acceptable as long as they possess certain characteristics. The packet containing the DTMF should have a time stamp indicating its temporal ordering relative to the voice packets. The packet containing the DTMF should indicate the duration of the DTMF represented by this packet. Otherwise a lost packet might cause DTMF to be on forever. The DTMF packet should also not be subject to worse delay jitter than the voice packets. Otherwise the DTMF packet might arrive too late to mute the audio.

The following are examples of techniques for sending DTMF packets. The DTMF can be sent as an alternative payload type within the same packet stream that carries the voice packets. In a preferred embodiment, the DTMF can be sent as a separate packet stream (e.g. in RTP) with a time stamp and duration time-locked to the voice packet stream. The DTMF can be sent in a separate User Datagram Protocol (UDP) or Transmission Control Protocol (TCP) control connection as is done in ITU standard H.245, but augmented with a time stamp and duration time-locked to the voice packet stream.

In order to prevent DTMF jitter worse then the voice packets, packets containing DTMF signals can be given higher transmission priority than packets containing encoded voice. This will give DTMF packets preferential treatment in the transmission queues of all intervening systems. Typical techniques for achieving this in IP-based network would be either to obtain a separate RSVP reservation for the DTMF-containing stream, or to set the IP Precedence of the DTMF packets higher than that of the voice packets.

The invention is typically implemented in DSP software used in any number of existing packet-based network processing devices such as the Model No. 3600 or 5300 routers, made by Cisco Systems, Inc., 170 West Tasman Drive, San Jose, Calif. 95134-1706.

By reducing the delay in the system as a whole, the performance of Voice-over-IP networks is significantly enhanced, and the voice quality of VoIP products using the invention improved.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A packet-based telephony system, including:
   a transmitting gateway including a voice encoder that converts a data stream having voice data and non-voice signaling data into voice packets without identifying whether data in the data stream is voice data or non-voice signaling data and a signal detector that identifies non-voice signaling data in the data stream, converts the signaling data into signaling packets, where the transmitting gateway is configured to transmit the voice and non-voice signaling packets; and
   a receiving gateway including a voice decoder that decodes the voice packets and outputs the decoded voice packets as voice signals and a packet identifier that discards the voice packets that include signaling data and instead outputs signaling data from corresponding signaling packets;
   where the voice encoder and the signal detector are connected and configured to operate in parallel, the voice encoder to encode the data stream into voice packets regardless of whether the data stream contains voice data or signaling data; and
   where a signaling detector is configured to decode only non-voice signaling data in the data stream.

2. A packet-based telephony system, including:
a transmitting gateway including a voice encoder that converts a data stream having voice data and non-voice signaling data into voice packets without identifying whether data in the data stream is voice data or non-voice signaling data and a signal detector that identifies non-voice signaling data in the data stream, converts the signaling data into signaling packets, where the transmitting gateway is configured to transmit the voice and non-voice signaling packets;
a receiving gateway including a voice decoder that decodes the voice packets and outputs the decoded voice packets as voice signals and a packet identifier that discards the voice packets that include signaling data and instead outputs signaling data from corresponding signaling packets; and
a jitter buffer that delays outputting the voice signals by a jitter buffer delay to account for network packet jitter, the packet identifier configurable to identify signaling packets that correspond with voice packets in the jitter buffer and to mute the corresponding voice packets during the jitter buffer delay;
where the voice encoder and the signal detector are connected and configured to operate in parallel, the voice encoder to encode the data stream into voice packets regardless of whether the data stream contains voice data or signaling data, without identifying whether data in the data stream is voice data or signaling data; and
where a signaling detector is configured to decode only non-voice signaling data in the data stream.

3. A packet-based telephony system, including:
a transmitting gateway including a voice encoder that converts a data stream into voice packets and a signal detector that identifies non-voice signaling data in the data stream, converts the signaling data into signaling packets;
a receiving gateway including a voice decoder that decodes the voice packets and outputs the decoded voice packets as voice signals and a packet identifier that discards the voice packets that include signaling data and instead outputs signaling data from corresponding signaling packets; and
a jitter buffer that delays outputting the voice signals by a jitter buffer delay to account for network packet jitter, the packet identifier configurable to identify signaling packets that correspond with voice packets in the jitter buffer and to mute the corresponding voice packets during the jitter buffer delay;
where the voice encoder and the signal detector are connected and configured to operate in parallel, the voice encoder to encode the data stream into voice packets regardless of whether the data stream contains voice data or signaling data and the signaling detector to decode only detected signaling data in the data stream; and
where the jitter buffer delay is set to be equal to or greater than a time period required by the transmitting packet gateway to verify the existence of signaling data in the data stream.

4. The packet telephony system of claim 3, the voice decoder to convert voice packets in the jitter buffer to voice signals, the voice decoder comprising a signaling generator to convert the signaling packets into signaling data, the packet identifier to enable one of the voice decoder and the signaling generator depending upon when signaling packets are detected in the receiving gateway.

5. The packet telephony system of claim 3, further comprising:
a packetizer coupled to outputs of both the voice encoder and the signaling detector; and
a transmitter coupled to an output of the packetizer.

6. The packet telephony system of claim 3, the signaling data comprising Dual Tone Multi-Frequency (DTMF) signals.

7. The packet telephony system of claim 3, the signaling packets and the voice packets comprising time stamp values, the packet identifier to discard a voice packet when a signaling packet is received that has the same time stamp value.

8. A method for processing signaling in a packet telephony system, the method comprising:
encoding a telephony data stream having voice data and non-voice call signaling data into voice packets without identifying whether data in the data stream is voice data or non-voice call signaling data;
identifying non-voice call signaling data in the telephony data stream;
transmitting the voice packets containing the voice data and the voice packets containing the non-voice call signaling data;
encoding identified non-voice call signaling data into signaling packets and transmitting the signaling packets along with the voice packets.

9. A method for processing signaling in a packet telephony system, the method comprising:
encoding a telephony data stream having voice data and non-voice call signaling data into voice packets;
identifying signaling in the telephony data stream;
transmitting the voice packets containing the voice data and the voice packets containing the non-voice call signaling data;
encoding identified non-voice call signaling data into signaling packets and transmitting the signaling packets along with the voice packets;
delaying decoding and outputting of received voice packets for a delay period to account for network packet jitter;
identifying the voice packets that contain signaling during the delay period; and
outputting the voice packets containing voice data while muting the voice packets containing signaling and instead outputting data from the corresponding signaling packets.

10. The method of claim 9, further comprising delaying the decoding and the outputting of the voice packets by temporarily storing the voice packets in a jitter buffer.

11. The method of claim 10, further comprising setting the jitter buffer to hold voice packets for at least a 40 Millisecond Dual Tone Multi-Frequency (DTMF) detection period.

12. The method of claim 9, further comprising encoding Dual Tone Multi-Frequency (DTMF) non-voice call signaling data into the voice packets and the signaling packets.

13. A method for processing signaling in a packet telephony system, the method comprising:
encoding a telephony data stream having voice data and non-voice call signaling data into voice packets;
identifying signaling in the telephony data stream;
transmitting the voice packets containing the voice data and the voice packets containing the non-voice call signaling data;
encoding identified non-voice call signaling data into signaling packets and transmitting the signaling packets along with the voice packets, the voice packets and the signaling packets including time reference values;
encoding and transmitting the voice packets and the signaling packets having the same time reference values.

14. A system for processing signaling in a packet telephony system, the system comprising:
   means for encoding a telephony data stream having voice data and non-voice signaling data into voice packets without identifying whether data in the data stream is voice data or signaling data;
   means for identifying signaling in the telephony data stream;
   means for encoding identified signaling into signaling packets;
   means for associating time reference values with the voice packets and the signaling packets; and
   means for transmitting the voice packets and the signaling packets having associated time reference values.

15. A system for processing signaling in a packet telephony system, comprising:
   means for encoding a telephony data stream into voice packets;
   means for identifying signaling in the telephony data stream;
   means for encoding identified signaling into signaling packets;
   means for associating time reference values with the voice packets and the signaling packets;
   means for transmitting the voice packets and the signaling packets having associated time reference values;
   means for delaying decoding and outputting of received voice packets for a delay period to account for network packet jitter;
   means for identifying the voice packets that contain signaling during the delay period; and
   means for outputting the voice packets containing voice data while muting the voice packets containing signaling and instead outputting data from the corresponding signaling packets.

16. The system of claim 15, further comprising means for encoding Dual Tone Multi-Frequency (DTMF) signaling into the signaling packets.

17. A system for processing signaling in a packet telephony system, the system comprising:
   means for encoding a telephony data stream into voice packets regardless of whether data in the telephony data stream is voice or non-voice signaling;
   means for identifying non-voice signaling in the telephony data stream;
   means for encoding identified non-voice signaling into signaling packets;
   means for associating time reference values with the voice packets and the signaling packets; and
   means for transmitting the voice packets and the signaling packets having associated time reference values;
   where a signaling packet and an associated voice packet have a same time reference value.

18. An computer readable medium containing software for processing signaling in a packet telephony system, the electronic storage medium comprising:
   code for encoding a telephony data stream including voice data and non-voice call signaling data into voice packets, without identifying whether data in the data stream is voice data or signaling data;
   code for identifying the non-voice call signaling data in the telephony data stream;
   code for transmitting the encoded voice packets containing the voice data and the encoded voice packets containing the non-voice call signaling data; and
   code for encoding identified non-voice call signaling data into signaling packets and transmitting the signaling packets along with the voice packets.

19. An computer readable medium containing software for processing signaling in a packet telephony system, the electronic storage medium comprising:
   code for encoding a telephony data stream including voice data and non-voice call signaling data into voice packets;
   code for identifying the non-voice call signaling data in the telephony data stream;
   code for transmitting the encoded voice packets containing the voice data and the encoded voice packets containing the non-voice call signaling data; and
   code for encoding identified non-voice call signaling data into signaling packets and transmitting the signaling packets along with the voice packets;
   code for delaying decoding and outputting of received voice packets for a delay period to account for network packet jitter;
   code for identifying the voice packets that contain signaling during the delay period;
   code for outputting the voice packets containing voice data while muting the voice packets containing signaling and instead outputting data from the corresponding signaling packets;
   code for encoding and transmitting the voice packets and the signaling packets having a same time value; and
   code for encoding Dual Tone Multi-Frequency (DTMF) signaling into the voice packets and the signaling packets.

* * * * *

UNITED STATES PATENT AND TRADEMARK OFFICE
CERTIFICATE OF CORRECTION

| | |
|---|---|
| PATENT NO. | : 7,233,605 B1 |
| APPLICATION NO. | : 10/888724 |
| DATED | : June 19, 2007 |
| INVENTOR(S) | : David R. Oran |

It is certified that error appears in the above-identified patent and that said Letters Patent is hereby corrected as shown below:

Title Pg, Insert Item --(63), Continuation-in-part of application No. 09/201,274, filed on November 30, 1998, now Pat. No. 6,775,265.--.
    At column 1, line 25, please replace "118" with --18--.
    At column 10, line 7, please replace "An computer" with --A computer--.

Signed and Sealed this

Twenty-sixth Day of August, 2008

JON W. DUDAS
*Director of the United States Patent and Trademark Office*